US008588555B1

(12) United States Patent
Felch et al.

(10) Patent No.: US 8,588,555 B1
(45) Date of Patent: Nov. 19, 2013

(54) POWER-EFFICIENT SENSORY RECOGNITION PROCESSOR

(75) Inventors: Andrew C. Felch, Hanover, NH (US); Richard H. Granger, Lebanon, NH (US)

(73) Assignee: Cognitive Electronics, Inc., Lebanon, NH (US)

( * ) Notice: Subject to any disclaimer, the term of this patent is extended or adjusted under 35 U.S.C. 154(b) by 466 days.

(21) Appl. No.: 12/814,369

(22) Filed: Jun. 11, 2010

Related U.S. Application Data

(60) Provisional application No. 61/186,517, filed on Jun. 12, 2009.

(51) Int. Cl.
  *G06K 9/54*  (2006.01)
  *G06K 9/48*  (2006.01)
  *G06F 15/76* (2006.01)

(52) U.S. Cl.
  USPC ............................. 382/304; 382/199; 712/30

(58) Field of Classification Search
  None
  See application file for complete search history.

(56) References Cited

U.S. PATENT DOCUMENTS

2009/0147612 A1*  6/2009  McKenney ................ 365/227
2009/0150597 A1*  6/2009  Yang et al. ................ 711/103

OTHER PUBLICATIONS

Felch et al, "Accelerating Brain Circuit Simulations of Object Recognition with CELL Processors," 2007, Innovative architecture for future generation high-performance processors and systems, 2007. iwia 2007. international workshop on, pp. 1-10.*
Fieres et al, A Platform for Parallel Operation of VLSI Neural Networks, BICS 2004 Aug. 29-Sep. 1, 2004, pp. 1-7.*
Kuzume, et al., "FPGA-Based Lifting Wavelet Processor for Real-Time Signal Detection", "Signal Processing", Jun. 2, 2004, pp. 1931-1940, vol. 84, Publisher: Elsevier.
Tippetts, et al., "FPGA Implementation of a Feature Detection and Tracking Algorithm for Real-Time Applications", "ISVC", 2007, pp. 682-691, vol. 4841, Publisher: Springer-Verlag Berlin Heidelberg.
Nain, et al., "A Gray Level Feature Detector and Its Hardware Architecture", "Advances in Eletrical Engineering and Computational Science", 2009, pp. 135-145, Publisher: Springer Science + Business Media B.V.

* cited by examiner

*Primary Examiner* — Bhavesh Mehta
*Assistant Examiner* — David F Dunphy
(74) *Attorney, Agent, or Firm* — Loginov & Associates, PLLC; William A. Loginov, Esq.

(57) ABSTRACT

This invention provides a computer processor architecture optimized for power-efficient computation of certain sensory recognition (e.g. vision) algorithms on a single computer chip. Illustratively, the architecture is optimized to carry out low-level routines and a special class of high-level sensory recognition routines derived from research into human brain perception processes. In an illustrative embodiment, the processor includes a plurality of processing nodes, arranged in a hierarchy of layers, and the processor resolves features from sensory information input and provides the feature information as input to a lowest hierarchy layer thereof. The hierarchy simultaneously, recognizes multiple components of the features, which are transferred between the layers so as to build likely recognition candidates. Each node can further include memory constructed and arranged to refresh and retain features determined to be likely recognition candidates by a thresholding process. These are provided to an overseer that directs a function to occur.

9 Claims, 15 Drawing Sheets

POWER-EFFICIENT SENSORY RECOGNITION PROCESSOR

RELATED APPLICATIONS

This application claims the benefit of U.S. Provisional Application Ser. No. 61/186,517, filed Jun. 12, 2009, entitled POWER-EFFICIENT SENSORY RECOGNITION PROCESSOR, the entire disclosure of which is herein incorporated by reference.

STATEMENT REGARDING FEDERALLY SPONSORED RESEARCH OR DEVELOPMENT

This invention was made with U.S. government support under Contract Number N00014-08-C-0461, awarded by Office of Naval Research, Tom McKenna Code: 341, Project No. 08PR05271-00. The government has certain rights in this invention.

FIELD OF THE INVENTION

This invention related to power-efficient computer architecture, and more particularly to computer architecture employed in processing sensory information, such as acquired vision information.

BACKGROUND OF THE INVENTION

Through exponential improvement over the last 40 years, computers have become millions of times faster and more capable. The famous proposition known as Moore's Law generally sets forth the inevitability of rapidly increasing improvement in the power of computing devices. In this time, computers have become much more effective than humans at certain tasks such as playing chess and calculating taxes. Thus, it is notable that sensory observation tasks, such as visual object recognition, which humans find effortless, have only recently become computable with a sufficient quality of results to be practically useful in the real world. Vision systems that have been implemented commercially typically have just one programmed function, such as detecting traffic stop violations or determining assembly line defects on a trained object pattern. Although classes of algorithms with improved generalization and task flexibility exist, these have not found practical use, one reason being that their extreme complexity requires supercomputing resources such as large clusters. Many industries could benefit from the availability of improved vision systems but as long as these systems' are physically large (i.e. requiring a general purpose computer/PC), power hungry, expensive and immobile they are not appropriate for a practical, general recognition, application.

FIG. 1 details a standard implementation of general purpose (and various versions of a special purpose) computing arrangement 100. The arrangement 100 consists of a central processing unit (CPU) 110 that, as described below, can comprise one or more processing "cores." The CPU interacts with a memory 120 that stores program instructions and data upon which the program instructions operate using the CPU 110. A bus or other connectivity structure 130 connects the CPU 110 and memory 120 to each other and also to other functional components of the overall computer 100, including one or more input/output (I/O) devices 140, which are adapted to allow data output and display, data input and operation of various peripheral devices (for example graphical user interface (GUI) devices). The organization of the components is highly variable. Multiple memories, etc., can be provided in alternate arrangements. Likewise, the various components of the computer 100 can be provide on one physical circuit chip structure, or a plurality of physical circuit chip structures.

As noted above, more recently, general and special-purpose computers have implemented processor arrangements in which a plurality of separate, parallel-processing "cores" are provided on one or more physical circuit chip structures. Advances in the miniaturization of circuit design have concurrently enabled such multi-core arrangements to be provided with a physical footprint that heretofore supported fewer (or only one) core(s). The use of multiple cores, as noted, has yielded a degree of parallelism in the processing of programs and program threads. With reference to FIG. 2, the CPU 110 is implemented with multiple processing cores (four cores in this example) 220, 222, 224 and 226. The multiple cores are connected to an on-chip memory cache arrangement 240. In the best case (e.g. highly parallel, non-serially dependent tasks), four cores can finish an overall task approximately four times faster, although typically the benefit of multiple cores is significantly less due to serial dependencies inherent in the task(s).

For tasks that are easily divided into multiple subtasks, which can execute in parallel, it is contemplated to employ a plurality of discrete computers (Computers 1-7) together in a computer cluster 300 (FIG. 3) connected by one or more network switches 320 or other internetworking devices. In the best case, a cluster of N computers can complete the overall task N times faster. Note that if the overall problem is not divisible into multiple subtasks, the program is typically not adapted to execute on a cluster.

General purpose computers are particularly useful for their ability to execute programs written after the computer chips have been fabricated. That is, general purpose CPUs are not typically optimized for any individual program. However, if significant constraints can be placed on the types of algorithms that are to be executed by the computing device/processor, then its architecture can be optimized to excel at those calculations that are most important to the special class of programs it will run.

Some computer/processor architectures have been designed with the specific purpose of improved performance at sensory recognition (e.g. auditory, radar, medical scanning/imaging and vision). For example, some processors are adapted particularly to improve the performance of vision algorithms. In the 1980s, processors were designed and sometimes fabricated to accelerate certain portions of vision algorithms that constituted the slowest processing bottlenecks at the time. These older architectures have become outdated because they optimized for programs that would currently execute much faster than real time on existing general purpose processors, and thus, would not be very useful today.

Two modern architectures optimized for vision processing are the Acadia II processor made by Sarnoff Corp. of Princeton, N.J. (by way of background, refer to World Wide Web address http://www10.edacafe.com/nbc/articles/view_article.php?section=ICNews&articleid=679 089), and the EyeQ2 made by MobileEye N.V. of the Netherlands (by way of background refer to World Wide Web address http://www.mobileye.com/default.asp?PageID=319). These processors focus on power-efficient acceleration of low-level vision routines such as edge detection and tracking. For higher-level routines they integrate one or more general purpose CPU cores (either on-chip or off-chip). These architectures are appropriate for problems in which the higher-level routines are relatively simple and can run effectively using the onboard general-purpose processors.

However, even such modern processors are still limited in that they tend to be directed to particular higher level algorithms used to solve particular vision problems. That is, they may be optimized to carry out sets of algorithms particularly suited to a certain set of tasks, such as license plate recognition, but these algorithms are not useful for vehicle shape recognition, facial recognition or the like. In general, these processors do not emulate the theorized approach in which humans perceive and recognize visual objects and other sensory information in which features of a subject (for example a person's eye shape) are initially discerned by the mind and either discarded if incorrect, or accepted and then combined with other features (for example, the person's mouth) until the mind has confidence that it has made the correct recognition. This approach requires a large number of parallel tasks that build upon each other in differing combinations—a task not necessarily suited to modern processor architectures. Rather, performing this task with modern processors would require a massive investment in general purpose cores, an extremely power-hungry approach that limits the miniaturization of such an architecture.

The ability to provide a processor capable of running general recognition algorithms, capable of discerning a very large number of subjects is critical to constructing autonomous robots and self propelled vehicles, as well as general identification and recognition systems—used for example in surveillance and crime-control. However, most of these systems have significant limitations in power availability and/or size. A processor that can recognize hundreds or thousands of different trained (or extrapolated) subjects, but that exhibits small size and low power consumption is particularly desirable. This processor architecture should be easy to construct with conventional circuit fabrication techniques and allow for classes of recognition algorithms to be variously loaded and employed without need to alter the processor architecture significantly, or at all.

SUMMARY OF THE INVENTION

This invention overcomes the disadvantages of the prior art by providing a computer and/or processor architecture optimized for power-efficient computation of a class of sensory recognition (e.g. vision) algorithms on a single computer chip. Illustratively, the architecture is optimized to carry out both low-level routines in conjunction with a special class of high-level sensory recognition routines derived from research into how humans process sensory information, such as vision. In an illustrative embodiment, the processor for efficiently recognizing sensory information including a plurality of recognizable features defines a feature recognition engine that resolves features from the sensory information and provides a feature information input. A plurality of processing nodes, arranged in a hierarchy of layers, receives the input at a lowest layer thereof, and simultaneously, and in parallel, recognizes multiple components of the features. Recognized features are transferred between the layers so as to build likely recognition candidates and remove unlikely recognition candidates. The processor architecture can further include a memory in each of the nodes that is constructed and arranged to refresh and retain predetermined features related to likely recognition candidates as the features are transferred between the layers. A thresholding process in each of the nodes determines when at least one of the recognition candidates sufficiently matches predetermined criteria. Also, an overseer is provided with the recognition candidates that sufficiently match the predetermined criteria, and in response thereto, directs a function to occur

BRIEF DESCRIPTION OF THE DRAWINGS

The invention description below refers to the accompanying drawings, of which.

DETAILED DESCRIPTION

The description will be provided mainly in the context of a vision system. It is expressly contemplated that the teachings herein can be applied to other forms of sensory information capable of conversion into a tangible image or other resolvable arrangement of data. For example, in the case of auditory data, a complex waveform can be generated that includes a number of features. These features can be resolved to provide a mechanism for training and recognizing the underlying auditory subject in accordance with the teachings described herein. Likewise, a medical image derived from, for example, an MRI scan or radar signature can be resolved into features that allow for recognition in accordance with an embodiment herein.

Figure 1:
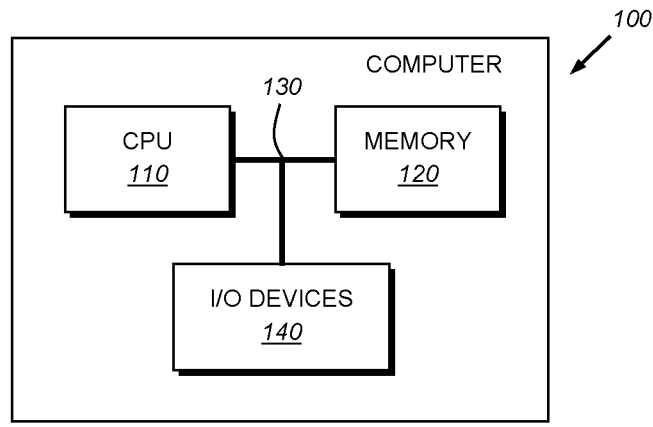
FIG. 1, already described, is a block diagram of a general purpose computer according to a prior art implementation.
Figure 2:
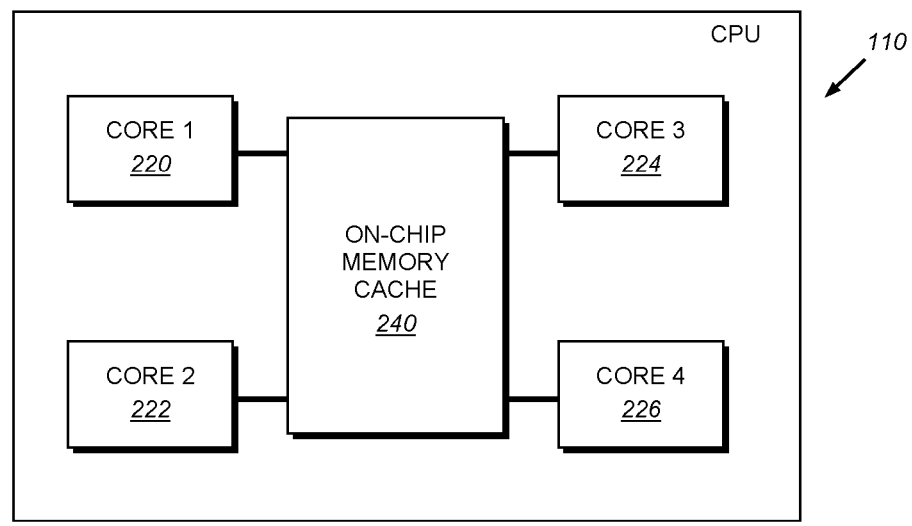
FIG. 2, already described is a multi-core CPU for a general purpose computer according to a prior art implementation.
Figure 3:
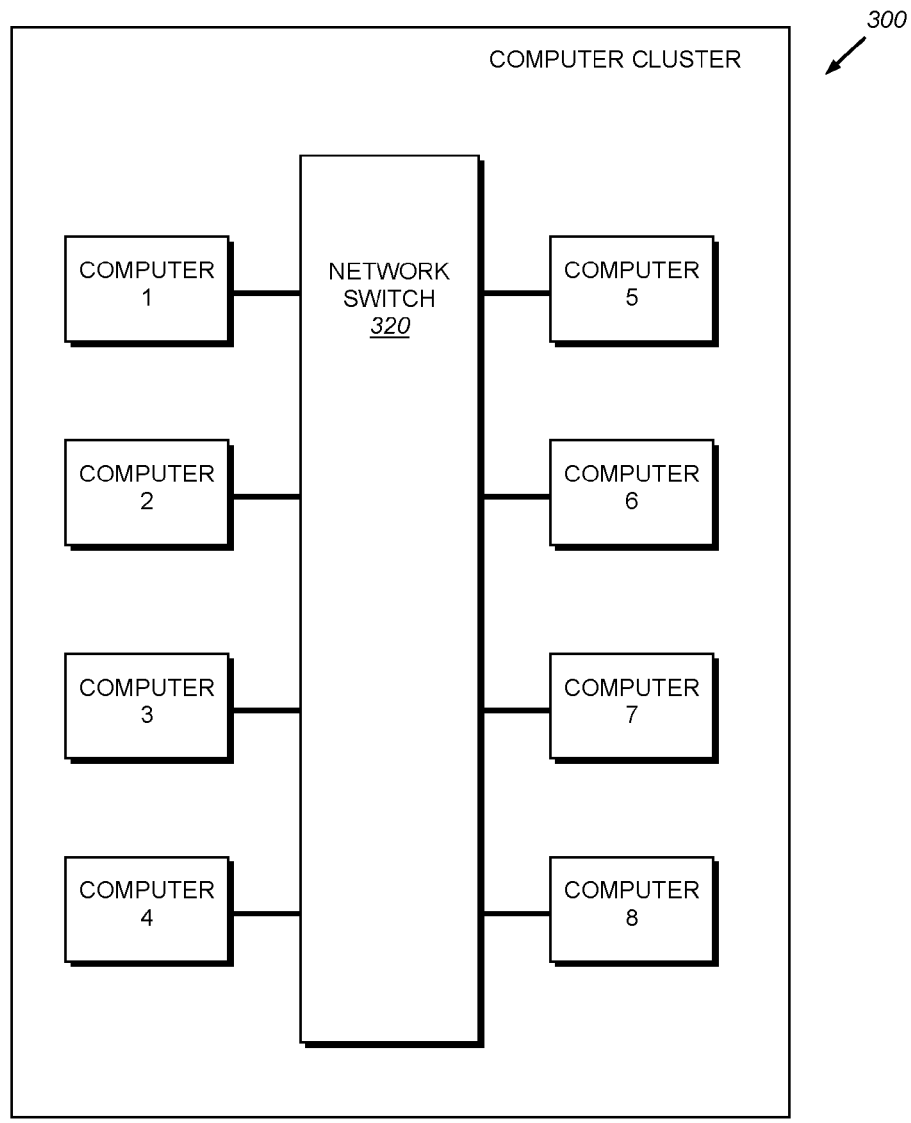
FIG. 3, already described, is a clustered computing arrangement, joined by a network switching architecture according to a prior art implementation.
Figure 4:
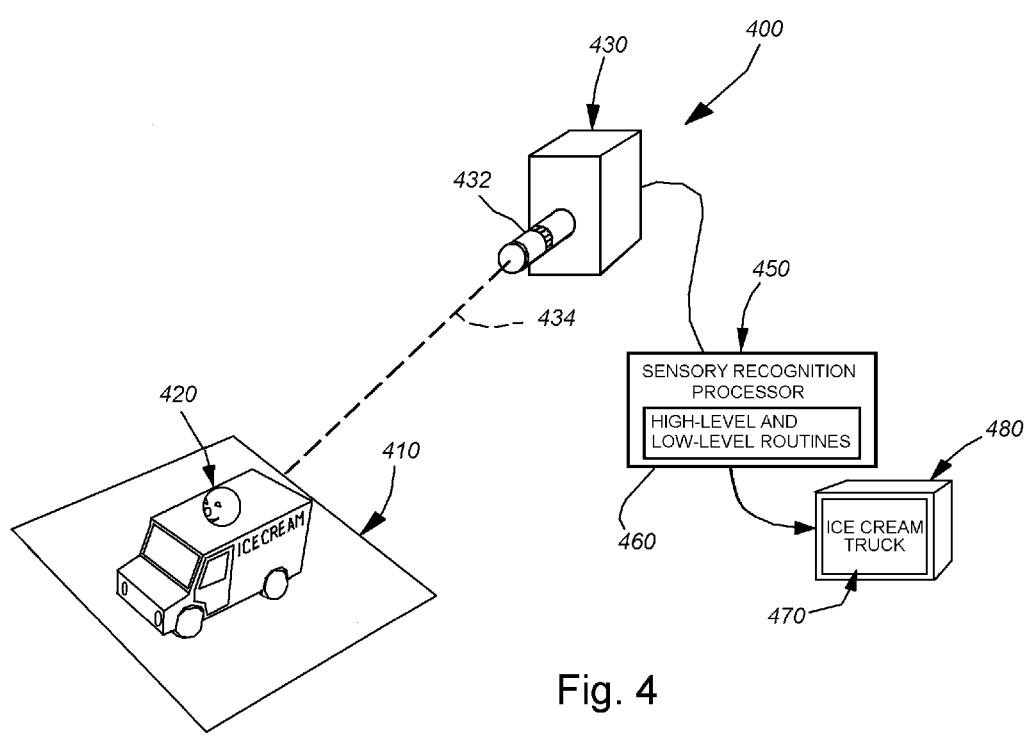
FIG. 4 is an overview diagram of a typical sensory recognition system, in this example, a vision system, including a sensory recognition processor according to an illustrative embodiment.

By way of example, FIG. 4 shows a generalized sensory recognition system 400 adapted to acquire and analyze visual data of a scene 410. In this case the scene 410 is a street containing a vehicle 420—in this example an ice cream truck. Such a system 400 can be part of a municipal crime-surveillance program or traffic control system. The system 400 includes a camera assembly 430, having a lens 432 with an optical axis 434 aligned on a portion of the subject truck 420 so that a sufficient image of the truck can be acquired to provide identifying features, as described further below. The camera 430 can include appropriate illumination and other systems needed to acquire images of the predetermined scene (for example, shutter control, frame grabber, etc.). It can be based upon a CCD, CMOS, or other image sensor architecture. The camera 430 can be a standalone unit, including all processing and data-output circuitry, or as shown, can be interconnected with a processor block 450 according to illustrative embodiments. The processor defines an architecture that executes both low-level routines 460 in conjunction with a special class of high-level sensory recognition routines to provide a fast, power-efficient sensory (e.g. visual) recognition processor. The results 470 of the recognition process are provided on a display 480, or used to trigger other events (e.g. sound an alarm, operate a function, etc.).

Figure 5:
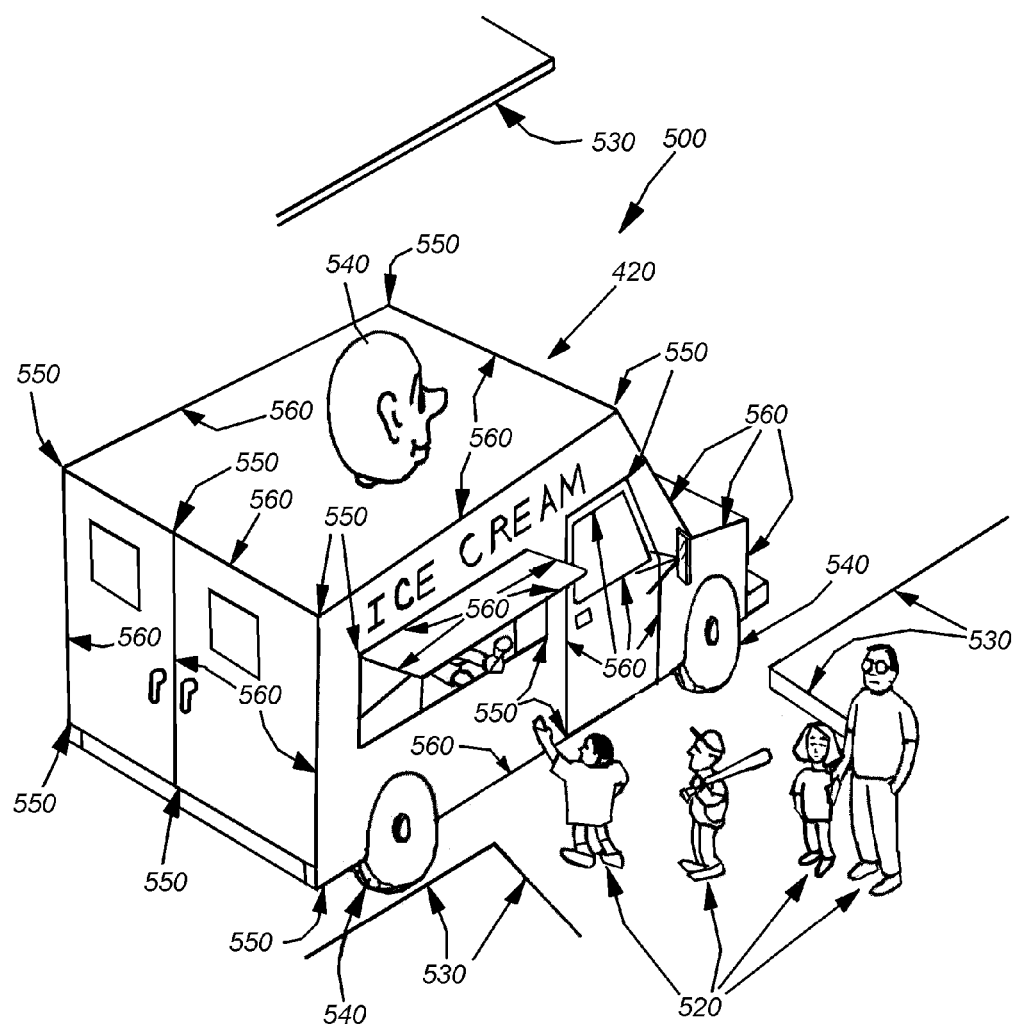
FIG. 5 is a diagram of an acquired image of a typical visual recognition subject applicable to the recognition system of FIG. 4, detailing various geometric shapes, such as line segments, corners and circles, which are candidates for recognizable features.

As described above, the processing architecture described herein operates using features extracted from acquired images or image sequences, which is a preliminary step common to many vision systems. FIG. 5 below shows an acquired image 500 of an exemplary object-to-be-recognized (the ice cream truck 420) and surrounding subjects 520 and road features 530) that may, or may not, require recognition. The image includes various types of features that can be extracted, such as full and partial circles 540, corner features 550 and line segment features 560. The system is able to operate interchangeably, i.e. using relationships of circles to circles, corners to corners, corners to line segments, circles to corners, line segments to corners, line segments to line segments, etc. For explanatory purposes the description will focus upon the case of corners only. However, the system extends beyond these basic feature types to include other features in a straightforward way.

Figure 6:
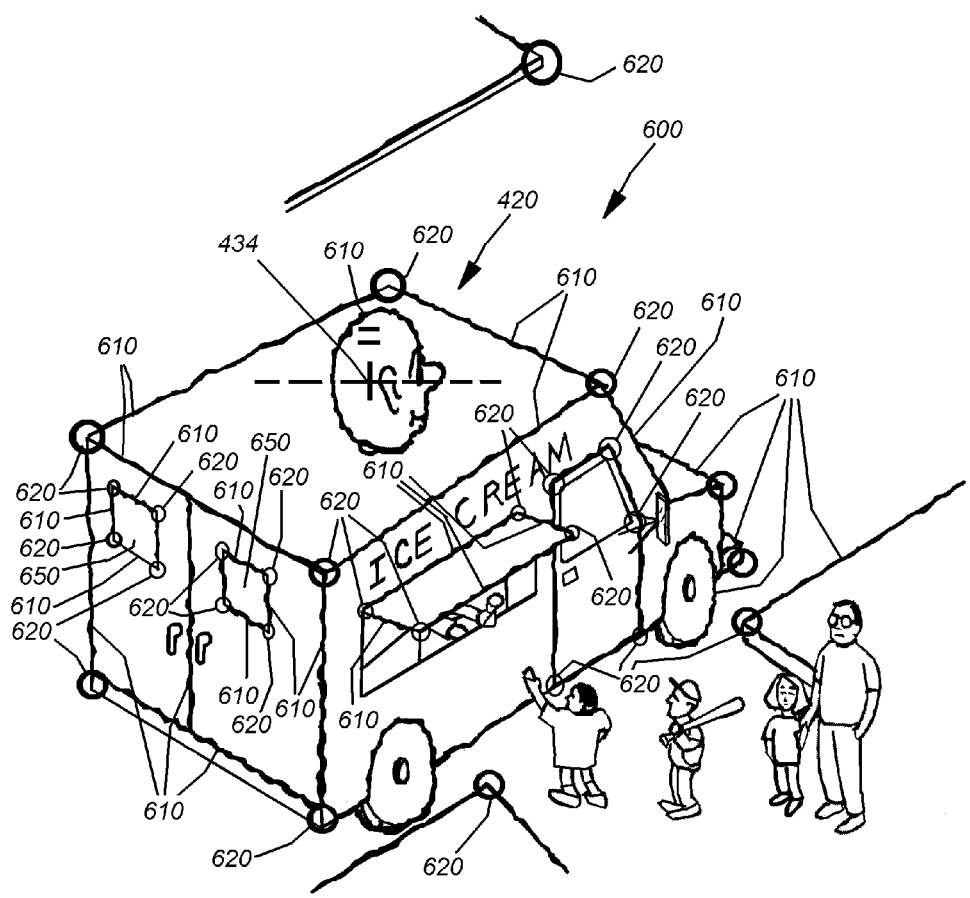
FIG. 6 is a diagram of the acquired image of FIG. 5 showing identification by the system of the various recognition features.

As shown in FIG. 6, the system has used conventional feature recognition applications to resolve the acquired image into line segments and part circles (shown by the superimposed outlines 610), as well as corners at the intersections of line segments (shown by the superimposed circled features 620). In alternate embodiments, other features, or additional features, can also be highlighted by the feature-detection application. The feature detection application can use a variety of well-known, high-speed algorithms, such as contrast edge detection and/or blob analysis to derive the depicted features. In the case of corners, a contrast pattern that exhibits the intersection of orthogonal lines can be identified as a corner feature.

Features that have been resolved by the feature-detection application are stored in the system memory in association with the overall pixel grid of the image. This provides the relative location of the features with respect to each other. As the image is scaled upwardly or downwardly, the ratio of relative locations remains the same.

Figure 7:
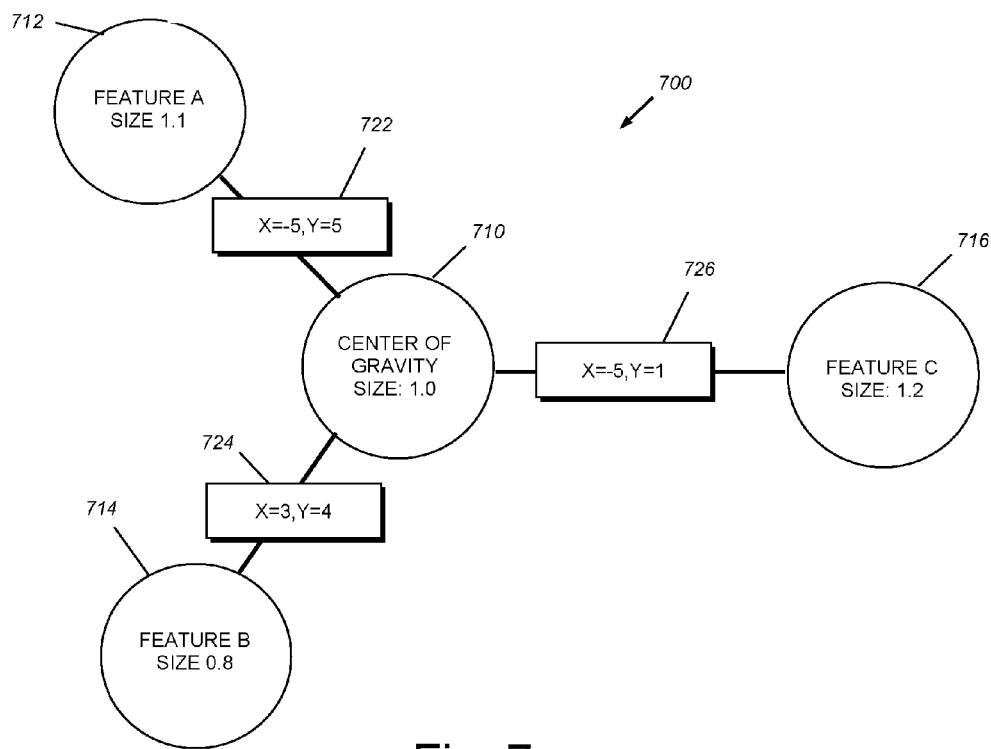
FIG. 7 is a diagram of a typical feature atom data structure defined by sub-features and an associated center of Gravity (CoG)

The system employs an illustrative data-structure as shown in FIG. 7 to retain information about the types of corner configurations or "partial-constellations" which are herein termed "atomic" relations or "atoms." An atom illustratively defines two or more sub-features and their expected spatial relationship in the image plane (the plane perpendicular to the camera axis). The data structures are used to identify sub-structures in an image that have been previously associated with objects that can be recognized. For example, an atom might relate the four corners of each depicted rear window 650 to each other so that the rear windows 650 can be recognized and, once recognized, can cause the system to search for other features found on the exemplary truck 420. In this manner, the system contemplates a hierarchical feature search technique, in which recognition of the correct subject occurs by building upon recognized features that are associated with that candidate subject until a sufficient number of features are recognized to ensure a proper match. Likewise, where candidates do not possess particular recognized features (and combinations of features), such candidates are dropped from the list of possible candidates in the particular recognition task.

Referring further to FIG. 6, each atom structure 700 has a "center of gravity" (CoG) 710, which is a point in the middle of the constellation to which all of the sub-features 712, 714, 716 relate. Each sub-feature has an identity or type, such as "Feature A", "Feature B", and/or "Feature C", and an X,Y offset 722, 724, 726, respectively of the sub-feature to the center-of-gravity 710 given a certain size of the atom 700 or sub-feature 712, 714, 716. The process of deriving atom centers and sizes from sub-features is called the hierarchical bottom-up process or HBU. The process of deriving sub-feature x, y locations and sizes from an atom's center of gravity and size is termed herein the hierarchical top-down process or "HTD."

More rigorously, for a given feature detected in an image $F_t$ with type $T_{F_t}$ and size $S_{F_t}$, an atom data structure $A_j$ with one sub-feature of type $T_{F_t}$ having relational offset $$\left(\overline{X}_{A_jT_{F_i}}, \overline{Y}_{A_jT_{F_i}}\right)$$

and relational size $$\overline{S}_{A_jT_{F_i}}$$

can derive its center of gravity location $$\left(X_{F_iA_j}, Y_{F_iA_j}\right)$$

using Equation 1 and Equation 2 and center of gravity size $S_{F_iA_j}$ using Equation 3.

$$\tilde{X}_{F_i,A_j} = X_{F_i} - \left(\overline{X}_{A_j,T_{F_i}} * \frac{S_{F_i}}{\overline{S}_{A_j,T_{F_i}}}\right) \quad \text{Equation 1}$$

$$\tilde{Y}_{F_i,A_j} = Y_{F_i} - \left(\overline{Y}_{A_j,T_{F_i}} * \frac{S_{F_i}}{\overline{S}_{A_j,T_{F_i}}}\right) \quad \text{Equation 2}$$

$$S_{F_i,A_j} = \frac{S_{F_i}}{\overline{S}_{A_j,T_{F_i}}} \quad \text{Equation 3}$$

Equations 1-3 are calculated for all incoming features and relevant atoms during the HBU process. The HTD process, on the other hand, illustratively derives for each atom's CoG instance the expected locations and sizes of the other sub-features within that atom. Equation's 1-3 are solved for sub-feature location/size derivation given a CoG location/size in Equations 4-6 respectively.

$$X_{F_i} = \tilde{X}_{F_iA_j} + \left(\overline{X}_{A_jT_{F_i}} * S_{F_i,A_j}\right) \quad \text{Equation 4}$$

$$Y_{F_i} = \tilde{Y}_{F_iA_j} + \left(\overline{Y}_{A_jT_{F_i}} * S_{F_i,A_j}\right) \quad \text{Equation 5}$$

$$S_{F_i} = S_{F_i,A_j} * \overline{S}_{A_jT_{F_i}} \quad \text{Equation 6}$$

Figure 8:
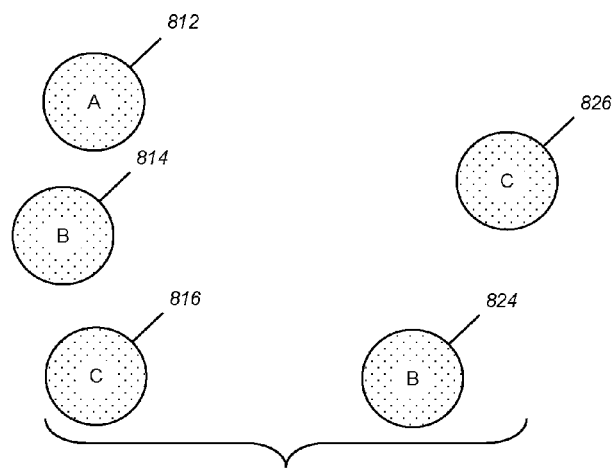
FIG. 8 is a diagram of an exemplary neighbourhood of sub-features in which features are recognized.
Figure 9:
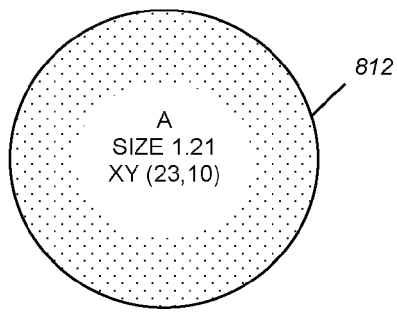
FIG. 9 is a diagram of a typical sub-feature of type A showing a size and grid location within the image field (e.g. pixel array)

Once expected locations for sub-features have been calculated (i.e. expected based upon a trained version of the subject with the same features and feature locations), the acquired image can be compared to these expectations and image features of the same type $T_{F_i}$ can be measured for distance from the expected sub-feature location. The minimum distance to the closest matching feature (same type) is summed with the other minimum-distances to determine an overall match score for the atom $A_j$. FIGS. 8-13 provide an example of a technique for calculating the overall expectation-deviation score (EDS). Corner features 812, 814, 816, 824 and 826 of discrete types A, B, and C have been extracted from an image and are arranged as shown in FIG. 8. FIG. 9, furthermore, shows the details of one of the feature instances, namely the A-type sub-feature instance. These details include the size and x, y coordinates of the feature.

Figure 10:
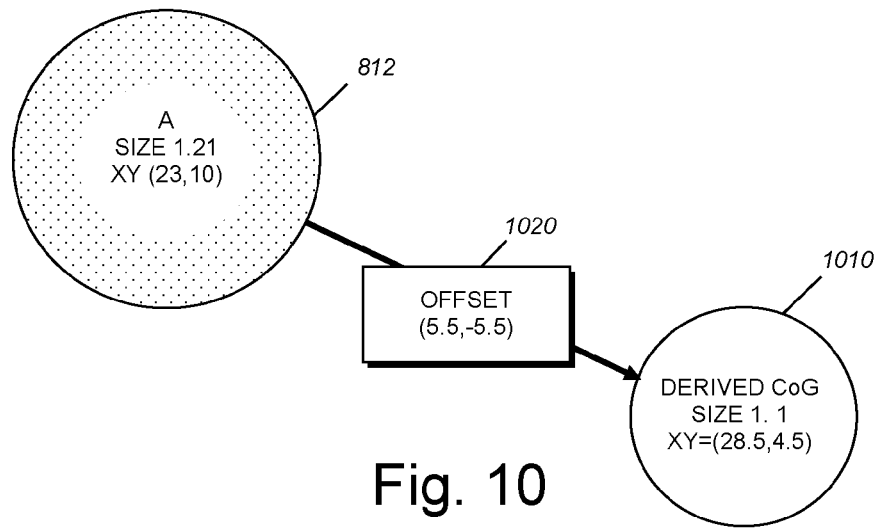
FIG. 10 is a diagram of the sub-feature of type A of FIG. 9 used to derive an expected CoG.

Using the atomic data structure 700 of FIG. 7 and Equations 1-3, the location and size of the CoG 1010 is derived as shown in FIG. 10, based upon the computed offset 1020. By way of example, the size of the sub-feature 812 (1.21) is used to compute a CoG size of 1.1 and the x, y location (23, 10) of the sub-feature 812 is offset by (5.5, −5.5) to produce a CoG Location of (28.5, 4.5).

Figure 11:
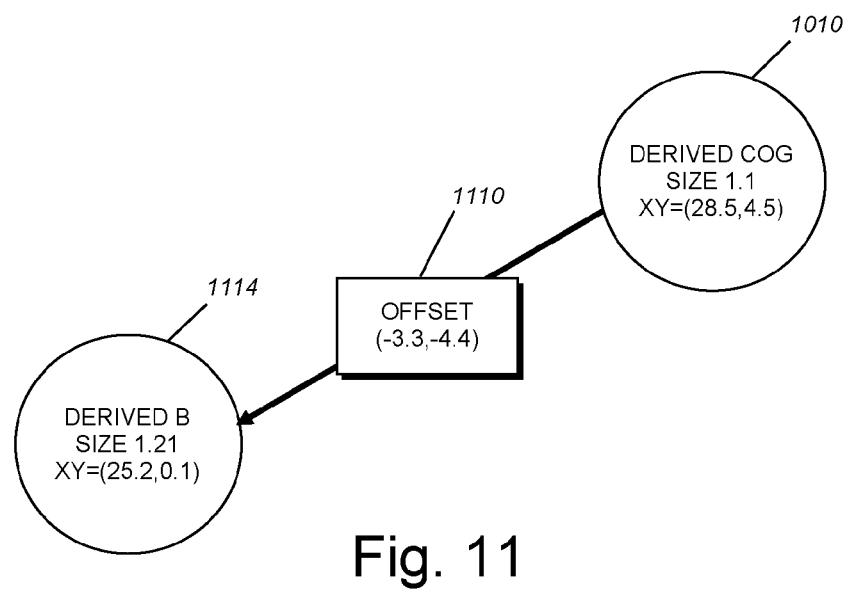
FIG. 11 is a diagram of the expected CoG of FIG. 10 used to derive an expected sub-feature of type B.

In FIG. 11 the derived CoG location and size are used with equations 4-6 to determine the location and size of the expected constituent Type-B sub-feature 1114. The exemplary sub-feature 1114 is offset (1110) from the CoG 1010 by (−3.3, −4.4). As shown further in FIG. 12, the expected location of the type-B sub-feature 1114 is compared to Type-B features found in the image (FIG. 8). Note that any image features not of similar size to the expected size (e.g. within 20%) will not be considered for the minimum-distance calculation. In this example, two Type-B image features 1214 and 1224 are of a size similar to the expected size and their respective distances 1230, 1232 to the expected location are calculated as 1.8 and 4.3. Thus, the minimum distance is 1.8 for the Type-B constituent sub-feature.

Figure 12:
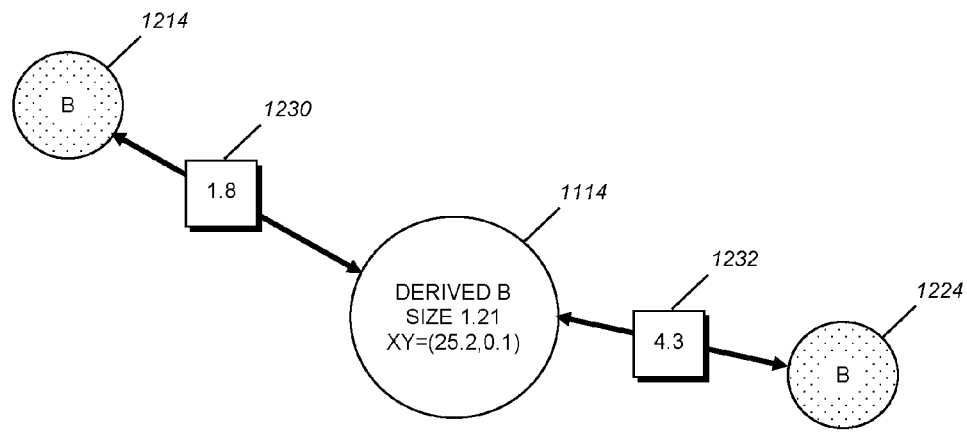
FIG. 12 is a diagram of the expected sub-feature of type B and computed minimum distances from image sub-features of type B in a neighbourhood thereof.
Figure 13:
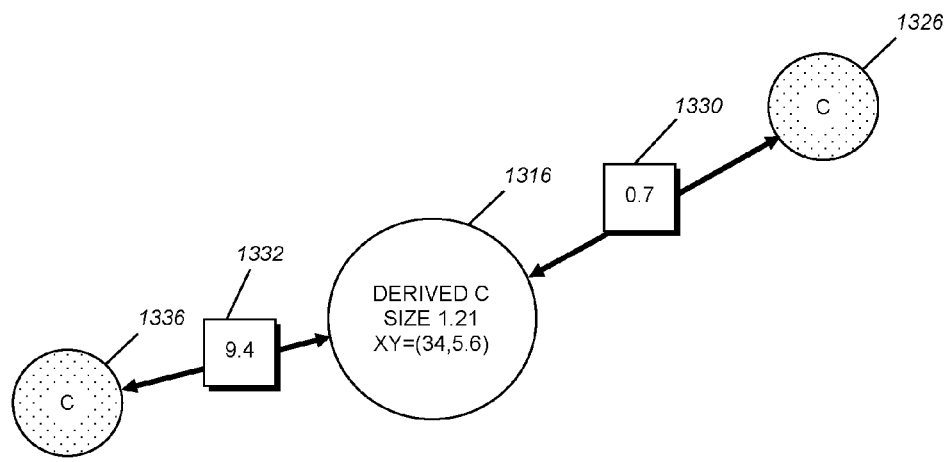
FIG. 13 is a diagram of an expected sub feature of type C and computed minimum distances from image sub-features of type C in a neighbourhood thereof.

FIG. 13 shows an illustrative minimum distance calculation for the Type-C sub-feature 1316, calculated in a similar fashion to that of the Type-B sub-feature (FIGS. 11 and 12). The minimum distance (distances 1330 and 1332 from respective sub-features 1326 and 1336) for the Type-C sub-feature 1316 is 0.7. Thus the overall expectation-deviation-score, the sum of the minimum distances, is 0.7+1.8=2.5.

Based upon the foregoing exemplary procedures, each atom instance can be derived throughout the image. This enables features to be employed in a hierarchical recognition process to be described below, using a processor architecture adapted to efficiently perform this process.

Figure 14:
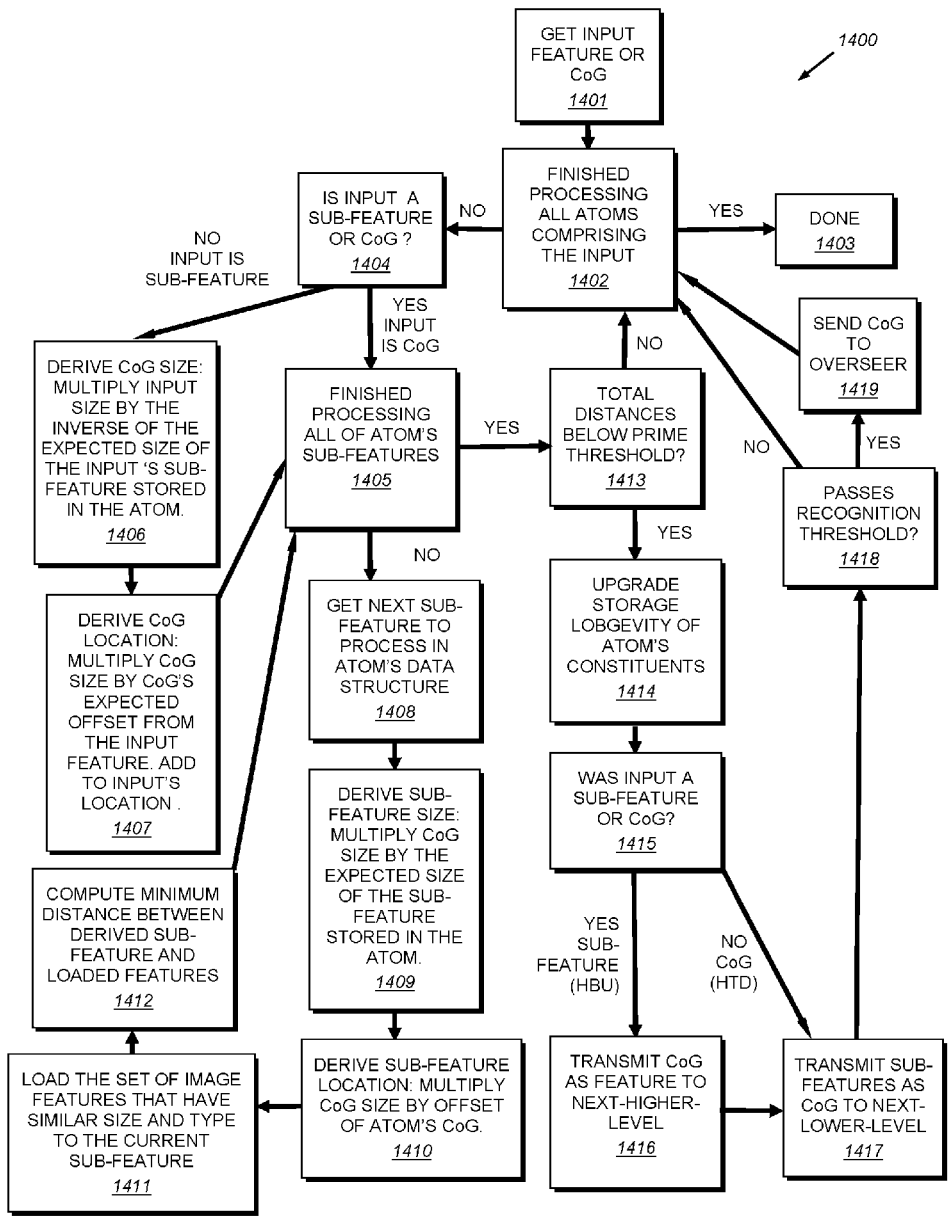
FIG. 14 is a flow diagram of a process for recognizing features in an acquired image based upon a use of a hierarchical sensory recognition processor architecture in accordance with an illustrative embodiment.

An illustrative process 1400 of searching for all the implied atom instances in an input image is shown in FIG. 14. When an input arrives (step 1401) at the processor (described further below) the atom data structures that use the input feature's type in a sub-feature are iterated through (decision step 1402) until finished (step 1403). It is also possible that the input feature is not a sub-feature (decision step 1404) but in fact the CoG of a specific atom (passed from a HTD process), in which case only the relevant atom data structure is retrieved via decision step 1405, etc. (described below). In the case that the input is a sub-feature (not a CoG) the size (step 1406) and location (step 1407) are derived for the CoG using Equations 1-3, an example of which was shown in FIG. 10. Next, the sub-features of the atom are iterated-through (decision step 1405). For each sub-feature (step 1408) the expected size (step 1409) and location (step 1410) is derived using Equations 4-6, an example of which was shown in FIG. 11. Next, the relevant image features (of the same type) that are within a certain maximum distance and which have a size within some percentage of the derived sub-feature's size are processed (step 1411). The distance from the image feature's location to the current sub-feature's expected location is measured and the minimum distance (step 1412) is summed to the EDS running total for the current atom. The process branches back to decision step 1405, where the iteration continues until all of the atom's sub-features are processed, wherein the process branches to decision step 1413, which determines if the total distances (EDS) are, or are not below a prime threshold.

The EDS is compared to a threshold (decision step 1413) and if the EDS exceeds the threshold, then processing the current atom has completed and the next atom (if not finished—via decision step 1402 and step 1403) is moved onto for processing (via decision steps 1402 and 1404). If the EDS is below the threshold (decision step 1413), then the image features that achieved minimum distances are "refreshed" in memory (step 1414) so that when future image frames arrive the old features will still be accessible. Image features that are not refreshed by this process are removed from memory after input of the next or just a few new frames, and thus will no longer arrive in sets processed in step 1411. Note that the system can employ a DRAM memory structure to hold the image features in memory. If so, it is contemplated that the architecture can exploit DRAM's natural data leakage "forgetting" mechanism to implement this erasure.

If the EDS qualified for refresh via decision step 1413, then additional signals are also sent depending on whether the input feature was a sub-feature or CoG (decision step 1415). In either case, the refreshed sub-features are transmitted as CoGs to the next lower-level processes (HTD) in step 1417. If the input was a sub-feature (sent from an HBU process), then the CoG identified by the current atom and the size/locations derived in steps 1406 and 1407 is first sent to higher-level processes (HBU) as a sub-feature in step 1416. Finally, if the EDS is below the "recognition threshold" (decision step 1418), then the CoG is transmitted (step 1419) to an overseer process. The overseer process is a higher level process that determines what object is being recognized by the input CoG, and can act on this information through I/O devices and/or communicate this information to the outside world through, for example, a wireless connection that links to a display, alarm, robot manipulation or trigger, or any other functionality. Following the overseer process, the process 1400 branches back to decision step 1402 to determine if more atoms require processing.

In summary, the system forms a hierarchy from the atoms found in an image. When initially-detected features (corners) are found in a configuration expected by a particular atom, the atom acts as a "detected feature" to the next-higher-level of processing. The next-higher-level of processing performs exactly as if its input features are corners, but in fact they are atoms that identify constellations of corners. The atom data structures used in the next-higher-level of processing describe relationships not between corners, but between atoms identified at the next-lower-level of processing. This procedure allows identification of higher and higher feature levels, with each processing level called a layer. Once a hierarchy is formed in one of the higher levels, and the constituent atoms and corners have matched the input image well, a signal is sent to an overseer process indicating that a very high-level feature has been identified. The overseer maintains a list that associates high-level atoms with object names, so that the overseer can determine what object has been identified based on the highest-level atom in the hierarchy.

Figure 15:
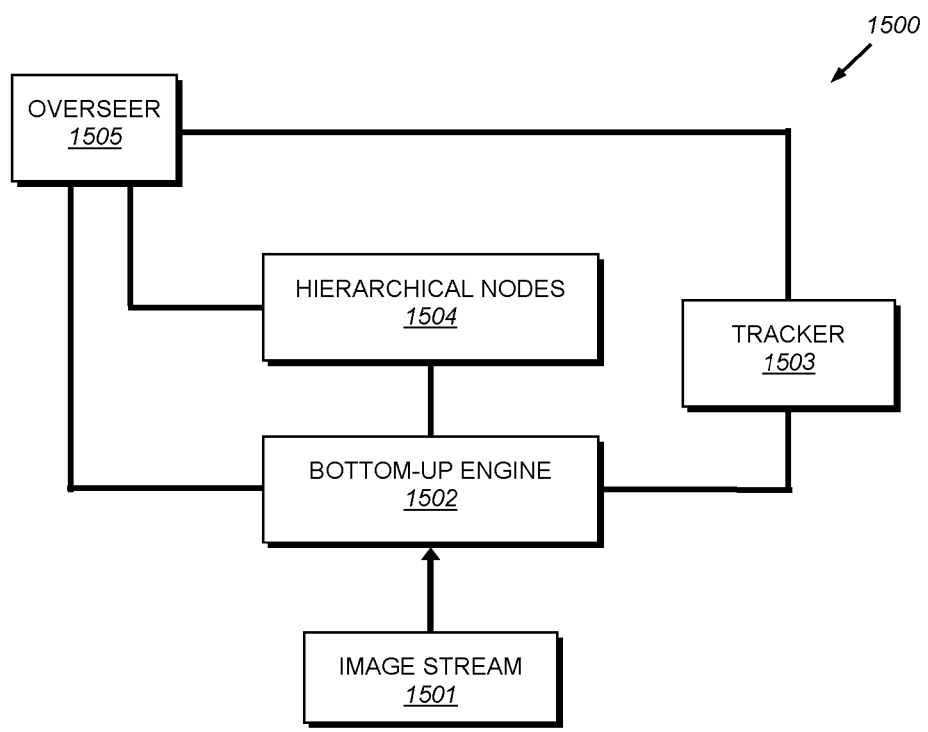
FIG. 15 is a block diagram of the high-level architecture for a sensory recognition processor according to an illustrative embodiment.

Having described an illustrative process for hierarchically recognizing features in a subject versus a trained feature set, a high-level overview of a novel processor architecture 1500 that efficiently carries out this system of computations is now shown in FIG. 15. This architecture 1500 can be implemented on a single computer chip, or a plurality of interconnected chips, each having predetermined functions.

As shown, the architecture 1500 receives a digital image (or other sensory information) stream 1501 at the architecture's Bottom-Up-Engine 1502. The bottom-up-engine 1502 extracts image features as illustratively described above, using conventional feature-extraction applications, and passes them along for further processing (step 1401 of process 1400 above). Techniques for implementing hardware feature extractors are well understood in the art, and the process is straightforward due to the high degree of simple parallelism inherent in the process. See, by way of useful background, Tippetts, B., Fowers S., Lillywhite, K., Leel, D. and Archibald, J., *FPGA Implementation of a Feature Detection and Tracking Algorithm for Real-time Applications.* *Advances in Visual Computing*, Springer Berlin/Heidelberg 2007; Nain, N., Kumar, R. and Bhadviya, B., *A Gray Level Feature Detector and Its Hardware Architecture, Advances in Electrical Engineering and Computer Science*, Springer Netherlands 2009; and Kuzumea, K., Niijimab, K., Takanob, S., *FPGA-based Lifting Wavelet Processor for Real-time Signal Detection, Signal Processing* 84:10, 2004.

The tracker 1503 receives feature information from the Bottom-Up-Engine, with which it determines feature movement in the x, y plane that has occurred between two frames so that image features can persist for multiple frames. Generally, the tracker assumes an affine transformation for features, where scale may vary, but rotation is approximately fixed and skew is also minimal. For short time intervals between acquired image frames, this approximately linear movement between frames is typically a valid assumption. Multiple satisfactory algorithms are well-understood for this process and this region of the chip can be implemented as a low-power processor or as custom circuits (see Tippetts, B., et al., referenced above). The overseer 1505, used to implement above-described step 1419, can also be implemented as a generic low-power processor because this module can be made free of any potentially bottlenecking vision/sensory-recognition routines. It interacts with the Bottom-Up Engine 1502 and the Tracker 1503, and also with the architecture's hierarchical nodes 1504. These hierarchical nodes provide a novel and efficient processing function within the processor architecture, as will now be described with further reference to FIG. 16.

Figure 16:
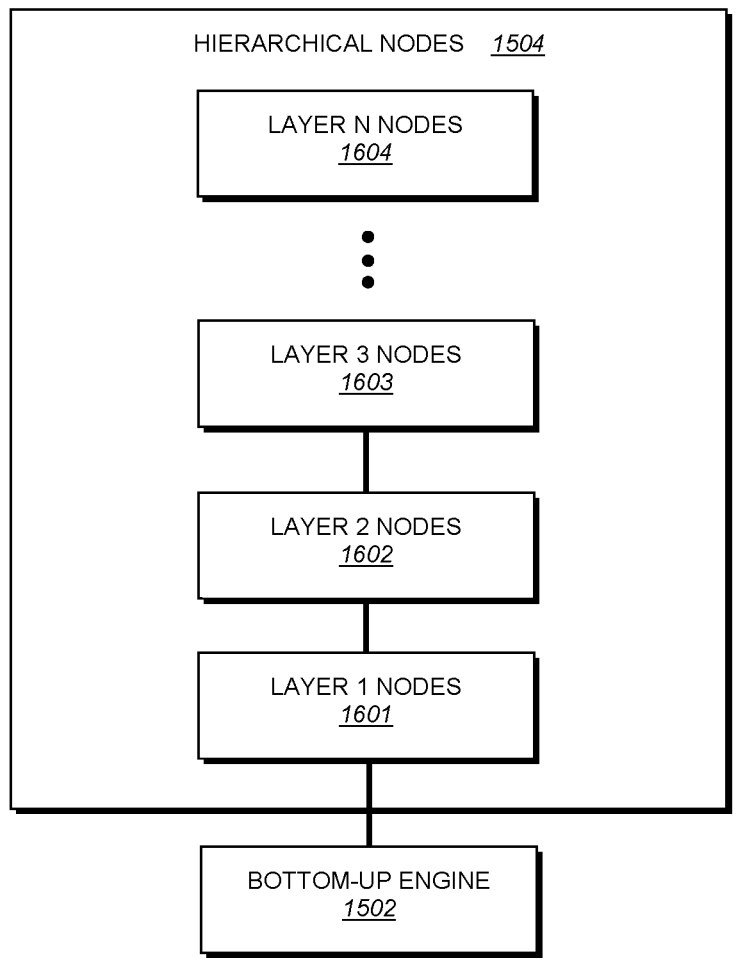
FIG. 16 is a block diagram of an exemplary hierarchical arrangement of layers of processing nodes for the sensory recognition processor of FIG. 15 according to an illustrative embodiment.

As shown in the top-level view FIG. 16, the hierarchical nodes structure 1504, receive input from the Bottom-Up Engine 1502. The nodes are arranged in a plurality of layers (Layers 1-N) that define the hierarchy and are referenced in FIG. 14 as the higher-level and lower level processes for CoGs and Features (see steps 1416 and 1417). In operation, Layer 1 (1601) receives the input from the Bottom-Up Engine 1502, processes it, and sends signals to Layer 2 (1602). Layer 2 (1602) communicates directly with each of Layer 1 (1601) and Layer 3 (1603). All other layers (1603, 1604) also communicate with the layer directly below them (except Layer 1) and the layer directly above them (except Layer N), just as described for the relationships of Layer 2.

Figure 17:
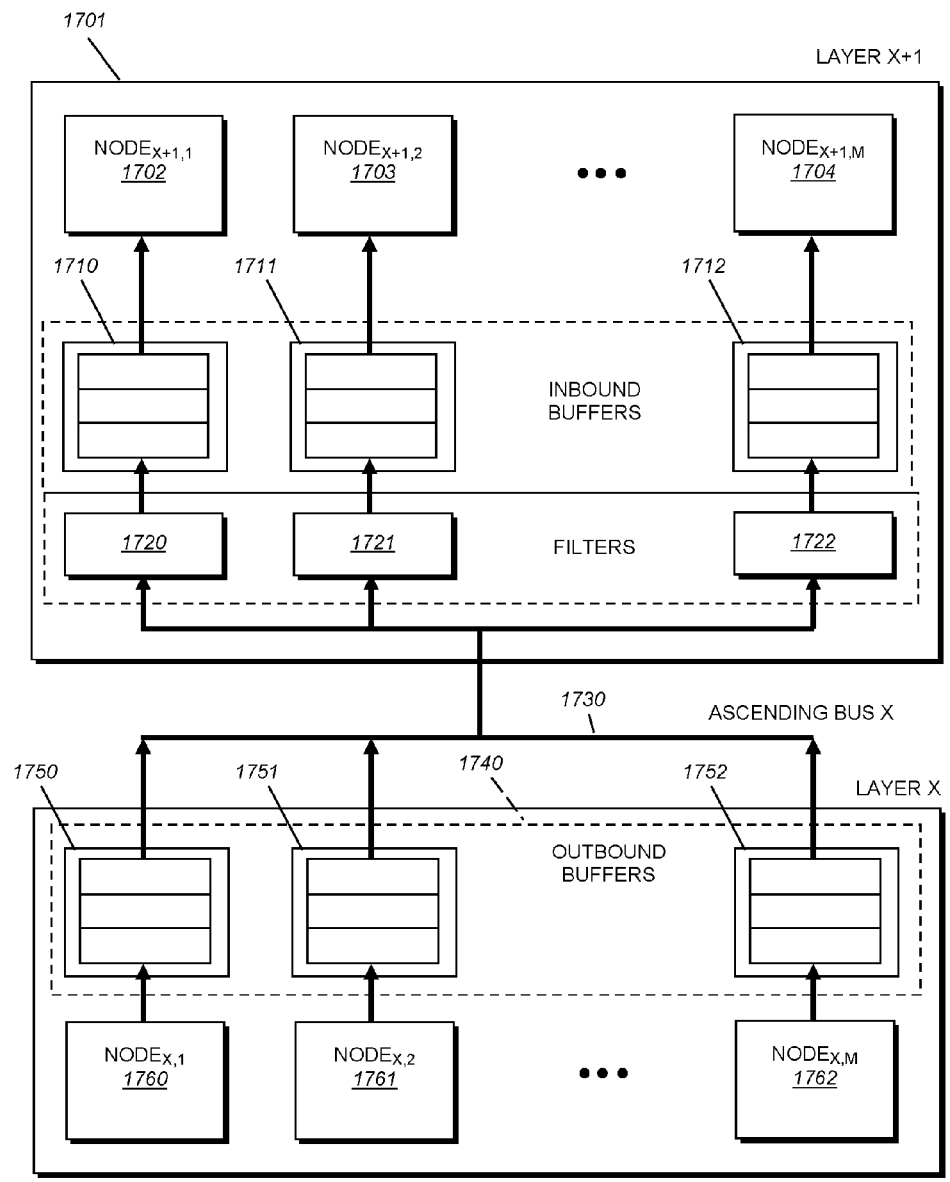
FIG. 17 is a block diagram of a pair of adjacent exemplary layers of processing nodes for the sensory recognition processor of FIG. 15 showing transmission of feature information from nodes in a lower-level node layer to nodes in a higher-level node layer on the ascending bus, and detailing buffers and filters associated therewith.
Figure 18:
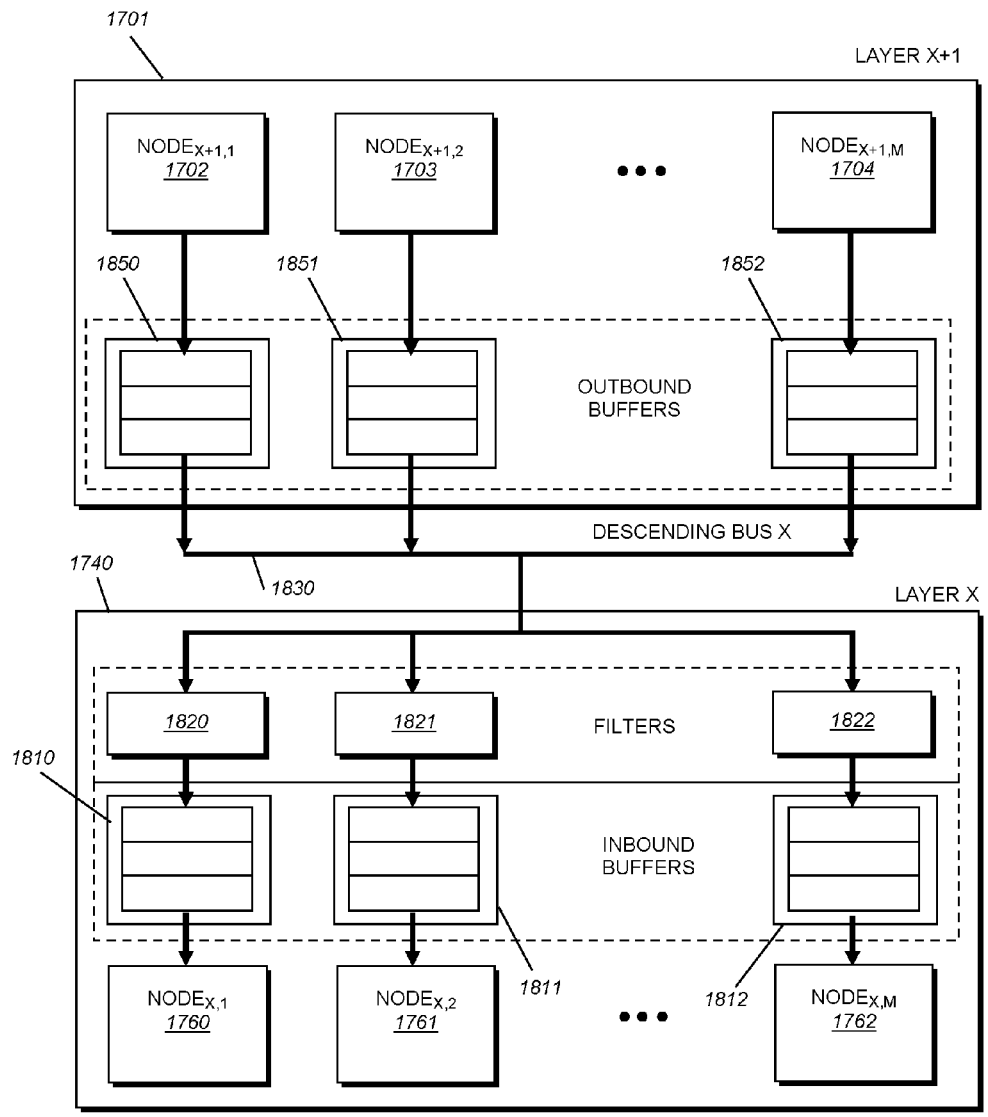
FIG. 18 is a block diagram of a pair of adjacent exemplary layers of processing nodes for the sensory recognition processor of FIG. 15 showing transmission of feature information from nodes in a higher-level node layer to nodes in a lower-level node layer on the descending bus, and detailing buffers and filters associated therewith.

FIGS. 17 and 18 respectively depict the transfer of feature information in an ascending manner and a descending manner between exemplary hierarchical node layers. Referring first to FIG. 17 there is depicted two arbitrary adjacent layers, Layer X+1 (1701), and lower Layer X (1740), and the ascending communication pathway 1730 between them. Each layer X, X+1, etc. includes a plurality of individual nodes. For example, each layer can include 1-M nodes, i.e. Layer X includes Nodes$_{X,1-X,N}$ (1760, 1761, 1762) and Layer X+1 includes corresponding Nodes$_{X+1,1-X+1,M}$ (1702, 1703, 1704). The lower-level nodes transfer output to their outbound buffers (1750, 1751, 1752) which each wait their turn for access to the ascending bus (Ascending Bus X) 1730. The buffers generally act as a memory for storing feature information transferred between layers. Once each buffer is given write access, it sends data onto the bus 1730, which can be received by any of the adjacent higher-level nodes 1702, 1703, 1704. The data arrives at the filters 1520, 1521, 1522 where data that is not required by the receiving nodes 1702, 1703, 1704 is discarded. In general, the filters operate in conjunction with the bus 1730, which is time-multiplexed, to allow information that is not sought by a given node to be ignored. This reduces cluttering of the interconnected buffers. Data that is allowed to pass through the filters arrives at the inbound buffers 1710, 1711, 1712 where it waits to be received by the receiving nodes 1702, 1703, 1704. Messages are sent along this pathway during the previously described step 1416.

Note that the number of layers and nodes within layers provided by the processor architecture is highly variable. In an illustrative embodiment, each layer contains 1–N nodes, but in alternate embodiments, the number of nodes in a given layer can vary. By way of example, in lower-level layers the number of nodes can be significantly larger than in higher-level layers (for example, approximating a pyramid structure), as fewer, more-likely recognition candidates will typically reach the higher levels, while a large number of candidate features are processed and discarded at the lower levels. Likewise, the particular arrangement (number, connectivity, size and function) of filters and buffers is highly variable in alternate embodiments. In alternate embodiments, various filters and/or buffers can be omitted.

FIG. 18 depicts the above-described arbitrary adjacent layer, Layer X+1 (1701) and Layer X (1740) and the descending communication pathway 1830 between them. Nodes (1702, 1703, 1704) send output to their outbound buffers 1850, 1851, 1852, which each wait their turn for access to the descending bus (Descending Bus X+1) 1830. Once the buffers 1850, 1851, 1852 receive write access, each buffer sends data onto the bus 1830, which can be received by any of the adjacent lower-level nodes 1760, 1761, 1762. The data arrives at the filters 1820, 1821, 1822, where data that is not required by the receiving nodes 1760, 1761, 1762 is discarded. Data that passes through each filter arrives at the inbound buffers 1810, 1811, 1822, where it waits to be received by the receiving nodes 1760, 1761, 1762. Messages are sent along this pathway during the previously described step 1417.

Figure 19:
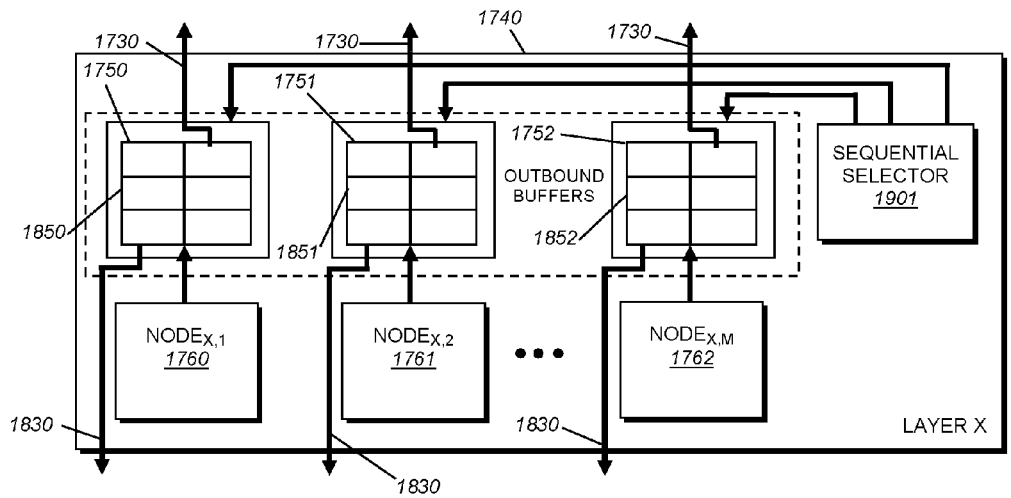
FIG. 19 is a block diagram showing the operation of the sequential selector to control transfer of feature information from buffers associated with processing nodes of one of the exemplary layers of FIGS. 17 and 18 selectively to each of the ascending bus and the descending bus.

FIG. 19 depicts exemplary Layer X 1740, including the system by which outbound buffers 1750, 1751, 1752 and 1850, 1851, 1852 (shown grouped together for simplicity) are notified when it is each their turn to write to a respective bus (Ascending Bus 1730 and Descending Bus 1830 in this example). The sequential selector (1901) implements a basic time-division-multiplexing of each bus 1730, 1830. Thus, each node is provided with a substantially equal amount of outbound bandwidth. This system aids in transmitting signals during steps 1416 and 1417 of the overall procedure 1400 (FIG. 14).

Figure 20:
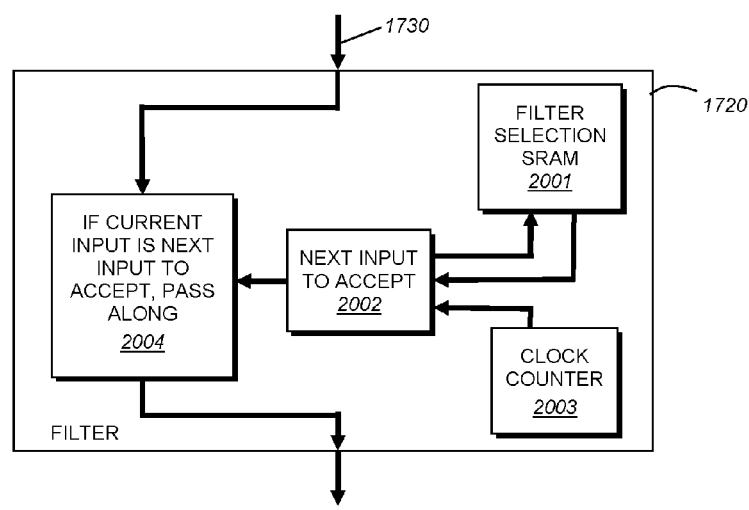
FIG. 20 is a block diagram showing a filter as depicted in FIGS. 17 and 18, associated with a processing node and buffer that minimizes transfer of unneeded feature information according to an illustrative embodiment.

FIG. 20 depicts the exemplary filter system 1720, which is substantially the same as filters 1721, 1722 and 1820, 1821, 1822. Each filter 1720, 1721, 1722 and 1820, 1821, 1822 prevents respective inbound buffers 1710, 1711, 1712 and 1810, 1811 and 1812 from becoming clogged/cluttered with unnecessary data. The filter contains memory 2001 (illustratively implemented as an SRAM) that stores the phases of the time-division-multiplexed bus that are to be listened to by the nodes. A clock counter 2003 keeps track of which phase in the time-division-multiplexed bus the system is currently in. The next input for acceptance is stored in a register 2002 or other storage location. This stored input is deployed to a filter-conditioner 2004 after the next input is accepted. The filter conditioner 2004 is adapted to only allow data to pass through if it is currently in an acceptance phase as indicated by the filter memory 2001 and current phase 2003 through the next-input-to-accept register 2002. This system aids in receiving signals sent during steps 1416 and 1417 of the overall procedure 1400 (FIG. 14).

Figure 21:
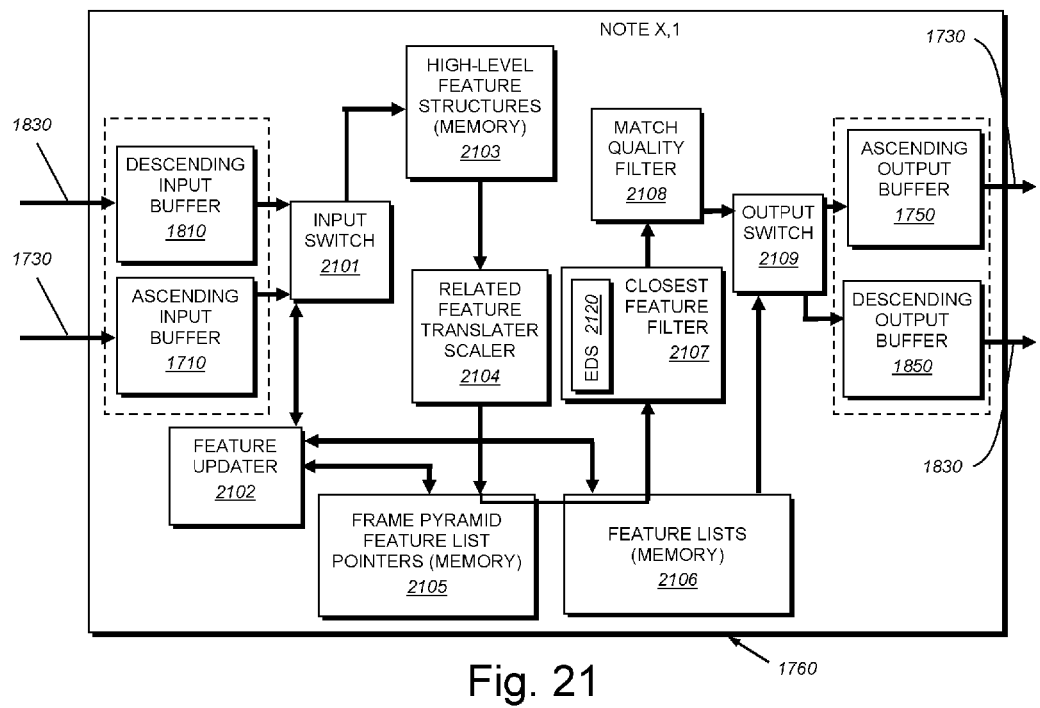
FIG. 21 is a block diagram of a processing node and associated inbound and outbound buffers for use in the hierarchical layers of nodes for the sensory recognition processor of FIG. 15.

FIG. 21 illustrates the architecture of a discrete node 1760 in accordance with an illustrative embodiment. The node 1760 is shown and described by way of example, but its structure and function are generally applicable to all nodes 1702, 1703, 1704, 1760, 1761, 1762, within all layers 1601, 1602, 1603, 1604 of the overall processor architecture. As described above, each layer can contain a plurality of nodes operating in parallel. As feature/CoG data is transferred between layers, each node in a given layer can operate simultaneously as part of the overall recognition process.

The descending and ascending input buffers 1810 and 1710, respectively, are shown as part of the node structure. These elements can be located within another logical construct of the overall node and layer matrix, and are depicted for descriptive purposes only. Likewise, the ascending output buffer and descending output buffer 1750 and 1850, respectively, are shown as part of the node. Filters 1720 and 1820 have been omitted from this depiction for clarity, but can be assumed to reside within the node's interconnectivity, as generally described in FIGS. 17 and 18.

In operation, data arrives from the descending pathway 1830 to the descending input buffer 1810 and from the ascending pathway 1730 to the ascending input buffer 1710. The input switch 2101 determines which input buffer 1810, 1710 will send the next input to be processed by the node. This decision can be made simply by choosing the buffer that is closer to being full. The buffer chosen by the switch 2101 determines the answer to decision step 1404 in the overall procedure 1400 (FIG. 14). If the ascending input buffer 1710 is chosen by the switch 2101, then the input is a sub-feature and the next step will be procedure step 1406 (FIG. 14), wherein the procedure 1400 derives CoG size and location (step 1407) from the input sub-feature. If the descending input buffer 1810 is chosen then the next step will be procedure step 1405, wherein the procedure 1400 determines whether all of a given atoms sub-features have been processed. Furthermore, if the ascending input buffer 1710 is chosen, then if the system reaches decision step 1415 while processing the selected sub-feature input, then step 1416 will follow step 1415. If the descending input buffer 1810 is chosen, then step 1417 will follow decision step 1415.

By way of example, if the process finds three sub-features in the first layer, the resulting CoG is passed up to the next layer. This layer will search for another CoG. If that next layer finds some sub-features, but a still-insufficient number of sub-features to positively recognize the other CoG, then it messages down to the lower layer (a Top-Down Process) to a node working on the atom responsible for that expected CoG. This CoG may not have been passed up from the lower level because not enough sub-features were found there (for example only two were found when three were needed), but due to the descending message calling up the two features, the confidence of the higher level recognition is increased. In this manner, the transfer of information up and down the layers allows the confidence of feature recognition to be increased where appropriate.

With further reference to the functional components of the exemplary node 1760 of FIG. 21, the inputs are first operated upon by the high-level feature structures functional block 2103. This component of the architecture stores, in memory, the various feature structures from previous steps. The atoms of the feature structures that are iterated through in step 1405 are output from the high-level feature structures functional block 2103 to the related feature translater scaler 2104. The related feature translater scaler 2104 is constructed and arranged to perform steps 1406, 1407, 1409 and 1410 for all constituent sub-features iterated through steps 1405 and 1408. The image feature set loaded in step 1411 is retrieved from the feature lists memory 2106, where sets of image features that have a similar size and type to the current sub-feature are stored. The retrieval process occurs by first retrieving the relevant address of the feature lists memory 2106 from the Frame Pyramid Feature List Pointers Memory 2105. The position and scale of sub-features derived by the related feature translater scaler 2104 determine the addresses (related to the pixel location in the acquired image) within the Frame Pyramid Feature List Pointers Memory 2105 from which data is to be retrieved and sent onward to the closest feature finder 2107 after feature retrieval completes in the feature lists memory 2106.

In the depicted embodiment described above the Frame Pyramid Feature List Pointers can comprise a Hash Table, and the entry inside the hash table can be looked up by computing the hash of the expected feature's grid location (both x and y) and its size (rounded/quantized). The value within the Frame Pyramid Feature List Pointers (memory) 2105 can be the address in the Feature Lists memory 2106 of a list or hash table that contains all of the features in the originally specified grid location and size. If the Feature Lists (Memory) 2106 uses lists then the features should be searched-through until features of the proper type are found, whereas if the Feature Lists (Memory) 2106 uses hash tables, then the expected type can be immediately looked-up within the table. Because hash tables should typically be oversized to achieve reasonable performance (e.g. ⅔ of entries are typically blank), using lists in the Feature Lists (Memory) 2106 allows lists to store the bulk of the feature data, reducing such overheads. A secondary method is to use just one memory that encompasses the information stored in these two memories 2105 and 2106 by computing the original hash on not only the grid location and size, but also the expected feature type. The benefit of using just one memory is that, when the hash table is sufficiently empty, fewer memory lookups need to be executed (e.g. one memory lookup instead of two lookups) and deleting old feature entries from a single hash table is generally less-complicated than also managing a second memory's 2106 memory allocation.

The closest feature finder 2107 performs step 1412 by computing the minimum distance between derived sub-features and loaded features i.e. the expected sub features. The closest feature finder 2107 maintains the EDS value 2120 for the current atom. Once finished, the EDS value 2120 is passed to the match quality filter 2108. The match quality filter uses the EDS value 2120 to make a threshold decision (decision steps 1413 and 1418). If the EDS is below the prime threshold then the sub-features are sent to the output switch 2109, which controls their subsequent transmission to the feature lists memory 2106 for refresh in accordance with step 1414 and also their transmission to the descending output buffer 1850. If the ascending input buffer 1710 was originally chosen (step 1415) then the CoG is sent to the ascending output buffer 1750. Finally, if the match quality filter 2108 determines that the EDS 2120 is below the recognition threshold, as performed in step 1418, then step 1419 is performed, and the CoG is sent to the overseer (1515 in FIG. 15) where the recognition thereof is processed by other functions to produce useful information or actions therefrom.

It should be noted that the system is initially provided with training features that correspond to subjects-to-be recognized. The overseer function can be responsible for maintaining the appropriate feature sets to which runtime features are matched. Training features can be provided synthetically, by physically loading particular feature types and locations on a subject-to-be-recognized, or training features can be derived from acquiring an image of a training object and using high-level recognition applications to resolve the feature set that runtime features will be compared-to. In various embodiments, the training features can be stored remotely, while the local device (a small robot, for example) carries the hierarchical processor and communicates wirelessly to exchange information regarding the specific subject that is being recognized. In addition to the efficiency gains achieved by the architecture of the novel circuit design/chip, it is contemplated that the system can operate at a generally slower speed in order to achieve even lower power consumption. This renders the circuit design potentially suitable for low-power applications that are also power-varying, such as low-power flying insect-like robots that rely on solar power to recharge.

It should be clear to those of skill in the art that the novel circuit design, built on a hierarchical arrangement of layers of individual processing nodes, each passing information up and down the layers allows for a given class of iterative algorithms to be performed at high speed and high power-efficiency. This circuit can be used in a wide variety of sensory recognition applications. It is applicable, for example, to general robotics, surveillance, image and video-based web searches that require recognition of image/video content, audio searches and recognition (for example, searching a web site such as "YouTube™" for content), generalized imaging recognition applications (medical, for example), and a wide variety of other applications.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the particular type(s) of features being processed is/are highly variable. In alternate embodiments, multiple feature types can be processed. The feature types can be segregated to certain parts of an overall processing array or mixed together within the nodes of the array. Likewise, the recognition process described herein can be varied and a different class of algorithms can be implemented within the processing architecture with appropriate changes to functions within each node to accommodate the different class of algorithms. Moreover the various processes and/or processors described herein can be implemented using one or more hardware components, software, including a computer-readable medium of program instructions or a combination of hardware and software. Accordingly, this description is meant to be taken only by way of example, and not to otherwise limit the scope of this invention.

What is claimed is:

1. A processor for efficiently recognizing sensory information including a plurality of recognizable features comprising:
   a feature recognition engine that resolves features from the sensory information and provides a feature information input; and
   a plurality of processing nodes, arranged in a hierarchy of layers, receiving the input at a lowest layer thereof and being constructed and arranged to simultaneously, and in parallel recognize multiple components of the features, and to transfer recognized features between the layers, and a filter at each node that receives from a bus and is configured to allow or reject a message communicated on the bus to proceed to an inbound buffer of the node for which it filters, and wherein each filter determines acceptance or rejection by comparing an input message to a value indicating the next input to accept, and wherein the value indicating the next input to accept is updated by retrieving a new value from a memory as determined by the current value and a clock, so as to build likely recognition candidates and remove unlikely recognition candidates; and a unit comparing a set of features retrieved from a hash table to an ideal feature and determining which feature from the set of features is the one that most closely matches the ideal feature.

2. The processor as set forth in claim 1 further comprising a memory in each of the nodes that is constructed and arranged to refresh and retain predetermined features related to likely recognition candidates as the features are transferred between the layers.

3. The processor as set forth in claim 2 further comprising a thresholding process in each of the nodes that determines when at least one of the recognition candidates sufficiently matches predetermined criteria.

4. The processor as set forth in claim 3 further comprising an overseer that is provided with the recognition candidates that sufficiently match the predetermined criteria, and in response thereto, directs a function to occur.

5. The processor as set forth in claim 1 wherein the sensory information is visual information and the feature recognition engine receives image data from at least one image sensor.

6. The processor as set forth in claim 1 further comprising a DRAM for storing feature data, and wherein said DRAM does not refresh the feature data that is to be erased.

7. The processor as set forth in claim 1 wherein communication from one layer to a next-higher layer is through an ascending communication bus, and from one layer to a next-lower layer is through a descending bus, wherein the communications are transferred efficiently such that a node sends a communication by inserting a message into an outbound buffer, and wherein a selector chooses which buffer is permitted to communicate over the bus.

8. The processor as set forth in claim 1 further comprising a first memory at each node from which features are retrieved using a hash table data structure, and a second memory that is constructed and arranged to retain high-level feature structures,
   wherein a feature is stored in the hash table at a position indicated by a hash key calculated from the location and scale of that feature, and
   wherein features are retrieved from the hash table if they are present at keys output by a unit calculating the locations and scales of features related to an input feature as determined by high-level feature structures held within the second memory, and wherein successful retrieval of features from the hash table is one criterion indicating an object recognition candidate.

9. The processor as set forth in claim 1 further comprising a match quality filtering unit receiving the closest matching feature as input and filtering matches further such that a minimum match quality is maintained by the outputs of the unit, and wherein the outputs of the match quality filtering unit are considered recognition candidates.

\* \* \* \* \*